United States Patent
Wyman

(10) Patent No.: US 7,589,790 B2
(45) Date of Patent: Sep. 15, 2009

(54) SYSTEM AND METHOD FOR DISPLAY OF 50 HZ VIDEO AT 60 HZ

(75) Inventor: Richard H. Wyman, Sunnyvale, CA (US)

(73) Assignee: Broadcom Corporation, Ivine, CA (US)

( * ) Notice: Subject to any disclaimer, the term of this patent is extended or adjusted under 35 U.S.C. 154(b) by 460 days.

(21) Appl. No.: 11/027,140

(22) Filed: Dec. 30, 2004

(65) Prior Publication Data

US 2006/0077295 A1   Apr. 13, 2006

Related U.S. Application Data

(60) Provisional application No. 60/617,456, filed on Oct. 8, 2004.

(51) Int. Cl.
*H04N 7/01* (2006.01)
*H04N 11/20* (2006.01)

(52) U.S. Cl. .................. 348/443; 348/448; 348/459

(58) Field of Classification Search ............... 348/441, 348/458, 443, 459, 454, 448, 452, 910; 345/475; 375/240.12, 240.26, 240.28
See application file for complete search history.

(56) References Cited

U.S. PATENT DOCUMENTS

| | | | | |
|---|---|---|---|---|
| 4,609,941 A | * | 9/1986 | Carr et al. ............. | 375/240.12 |
| 6,151,075 A | | 11/2000 | Shin et al. | |
| 6,658,056 B1 | * | 12/2003 | Duruoz et al. ............. | 375/240 |
| 2002/0171758 A1 | * | 11/2002 | Kondo et al. ............. | 348/441 |
| 2004/0057624 A1 | * | 3/2004 | Wells ............. | 382/233 |
| 2004/0071211 A1 | | 4/2004 | Washino | |

FOREIGN PATENT DOCUMENTS

| | | |
|---|---|---|
| GB | 1052438 | 12/1966 |
| GB | 2050109 | 12/1980 |
| WO | WO 98/06567 | 8/1998 |
| WO | WO 00/59219 | 10/2000 |

OTHER PUBLICATIONS

European Search Report corresponding to European Patent Application Serial No. 05017394.7-2223, dated May 11, 2009.

* cited by examiner

*Primary Examiner*—Victor R Kostak
(74) *Attorney, Agent, or Firm*—McAndrews Held & Malloy Ltd.

(57) ABSTRACT

A system and method that convert a video source from a first rate to a second rate. The system may have as an input a video that may be frame-based or field-based at a first rate, and convert the input video to an output video that may be frame-based or field-based at a second rate. The first rate may be 50 Hz and the second rate may be 60 Hz. Converting from the first rate to the second rate may comprise repeating frames or fields. For example, when converting from a frame-based 50 Hz input video to a frame-based 60 Hz output video, the output video comprises frames where every sixth frame is a repeated version of the preceding frame.

11 Claims, 4 Drawing Sheets

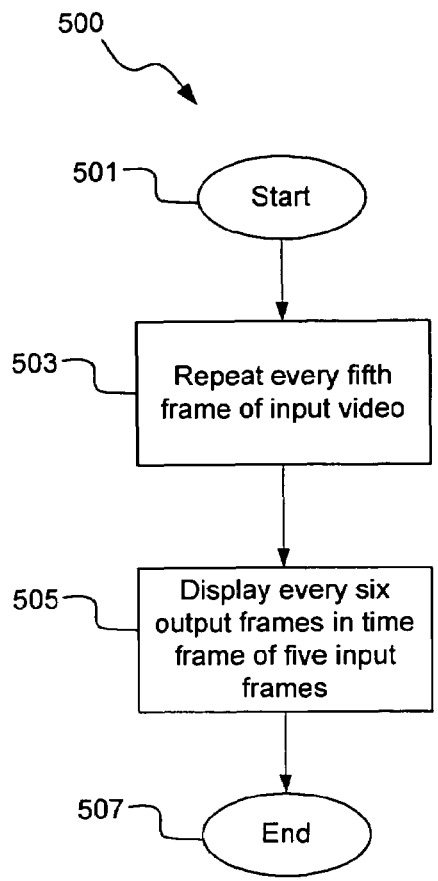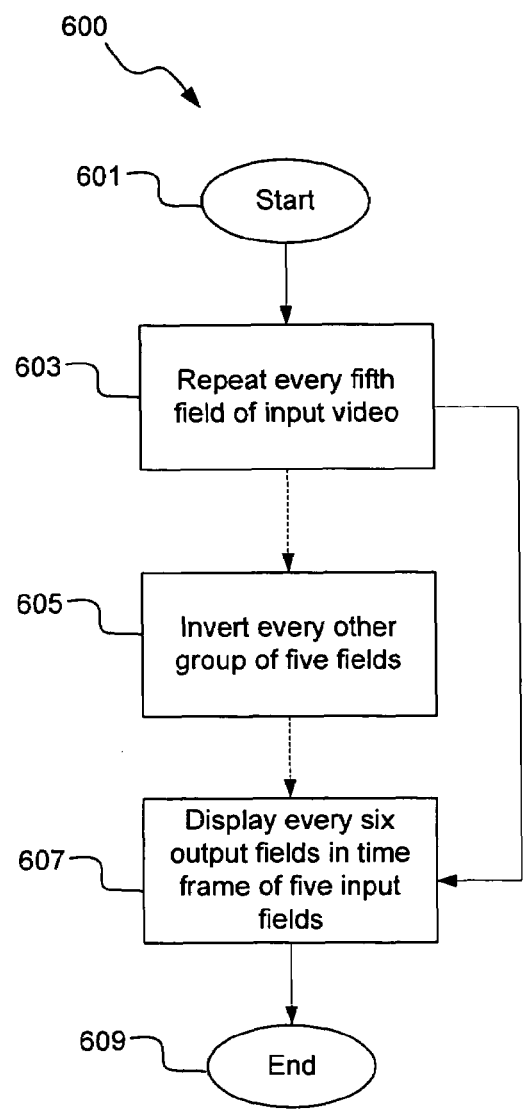
Fig. 5
Fig. 6

SYSTEM AND METHOD FOR DISPLAY OF 50 HZ VIDEO AT 60 HZ

RELATED APPLICATIONS

This patent application makes reference to, claims priority to and claims benefit from U.S. Provisional Patent Application Ser. No. 60/617,456, entitled "System and Method for Display of 50 Hz Video at 60 Hz," filed on Oct. 8, 2004, the complete subject matter of which is hereby incorporated herein by reference, in its entirety.

This application makes reference to:
U.S. Provisional Patent Application Ser. No. 60/616,071, filed Oct. 5, 2004;
U.S. patent application Ser. No. 11/051,415 filed Feb. 4, 2005;
U.S. patent application Ser. No. 11/027,365 filed Dec. 30, 2004; and
U.S. patent application Ser. No. 11/026,369 filed Dec. 30, 2004.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video can be displayed using several standards. One standard is in accordance with the National Television System Committee (NTSC) standard, which is used in certain parts of the world such as, for example, the United States. The frame rate of NTSC video is approximately 60 Hz. On the other hand, most of Europe uses the Phase Alternative Line (PAL) standard, which has a frame rate of 50 Hz.

There is a general belief that a 60 Hz display will flicker less than a 50 Hz display. Additionally, 60 Hz displays are currently more common, and hence cheaper than 50 Hz displays. Also, some countries, such as China, use both formats interchangeably. A multi-format display is generally more expensive than a single format display with some format conversion ability. As a result, there is interest in converting 50 Hz video to 60 Hz for display.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that convert a video source from a first rate to a second rate. The method may comprise receiving an input video at a first rate, wherein the input video comprises frames or fields, and reproducing the input video as an output video at a second rate, wherein the output video comprises frames or fields. Reproducing the input video as an output video at the second rate may comprise repeating the input video frames or fields to convert from the first rate to the second rate.

The input video may be, for example, MPEG video or analog video. The first rate may be 50 Hz and the second rate may be 60 Hz.

In an embodiment of the present invention, the input video and the output video may be frame-based. In such an embodiment, every sixth frame of the output video is a repeated version of the preceding frame.

In another embodiment of the present invention, the input video may be frame-based and the output video may be field-based. In such an embodiment, the method may further comprise converting the input video frames to fields. In such an embodiment, the output video may comprise fields where every sixth field is a repeated version of the preceding field.

In yet another embodiment of the present invention, the input video and the output video may be field-based. In such an embodiment, every sixth field of the output video may be a repeated version of the preceding field and alternating groups of five fields may be inverted. In such an embodiment, the final desired output may be frame-based, and a deinterlacer may be utilized to convert the output video fields to output video frames.

The system comprises circuitry capable of performing the method as described hereinabove that converts a video source from a first rate to a second rate.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 5 illustrates a flow diagram of an exemplary process of converting 50 Hz input progressive video to 60 Hz output progressive video, in accordance with an embodiment of the present invention.

FIG. 6 illustrates a flow diagram of an exemplary process of converting 50 Hz input interlaced video to 60 Hz output interlaced video, in accordance with an embodiment of the present invention.

DETAILED DESCRIPTION OF THE INVENTION

Aspects of the present invention relate to processing video signals. More specifically, certain embodiments of the invention relate to a method and system for converting a source video signal at a rate of 50 Hz to display at a rate of 60 Hz.

A video source may be considered to be 50 Hz if either its field rate is 50 Hz (e.g. standard PAL 576i) or its frame rate is 50 Hz (e.g. 720p50). Similarly, an output is considered to be 60 Hz if either its field rate is 60 Hz (e.g. 1080i30) or its frame rate is 60 Hz (e.g. 720p60). An output of 59.94 Hz may also be possible and may be achieved with a 50 to 60 Hz conversion with an occasional frame drop at the video source, as is described hereinafter.

Figure 1:
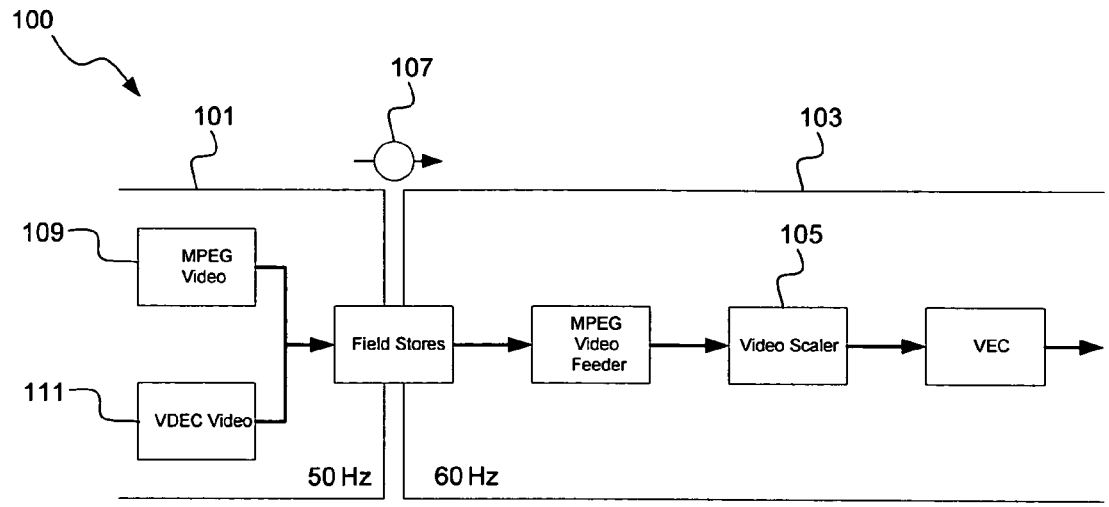
FIG. 1 illustrates an exemplary configuration of a video network, in accordance with an embodiment of the present invention.

FIG. 1 illustrates an exemplary configuration of a video network 100, in accordance with an embodiment of the present invention. The video network may comprise a video input side 101 and a video output side 103. In an embodiment of the present invention, the source video at the video input side 101 may be MPEG video or other digital video source 109 or VDEC video 111. Where the VDEC may provide analog video such as, for example, component, composite, or S-video.

In an embodiment of the present invention, the source video in the video input side 101 may be at 50 Hz progressive and the desired output video at the video output side 103 may be at 60 Hz, interlaced or progressive. Conversion from 50 Hz progressive to 60 Hz output (either interlaced or progressive) may be achieved using a scaler 105 and a sync slip buffer 107. For five input fields or frames, six output fields or frames may be produced. This may be achieved by repeating the fifth frame at the input of the scaler every five frames as follows:
. . . Fr Fr Fr Fr Fr FR Fr Fr Fr Fr Fr FR Fr . . .

where Fr may indicate a source frame, and FR may indicate a frame that is a repeat of the frame preceding it.

In another embodiment of the present invention, the source video at the video input side 101 may be at 50 Hz interlaced and the desired output video at the video output side 103 may be at 60 Hz progressive. Conversion from a field based source at 50 Hz (e.g. 1080i25) to a frame based output at 60 Hz (e.g. 720p60) may be similar to the frame based scheme above, except a sixth field may be produced by repeating the fifth field, every five fields. The operation may be illustrated as follows:
. . . T B T B T TR B T B T B BR T B . . .

where the TR top or BR bottom field is a repeat of the preceding field.

In yet another embodiment of the present invention, the source video at the video input side 101 may be at 50 Hz interlaced and the desired output video at the video output side 103 may be at 60 Hz interlaced. Conversion may be achieved by repeating a field every five fields, and field inverting six fields every twelve with the scaler 105. Field inverting may maintain the alternating top/bottom pattern at the display. The operation may be illustrated as:
. . . T B T B T <u>TRBTBTB</u> BR T B T B T <u>TRBTBTB</u> BR T . . .

where the TR top or BR bottom field may be a repeat of the preceding field and the underlined fields may indicate fields inverted in the scaler 105 to produce a bottom field from a top field and a top field from a bottom field.

Figure 2:
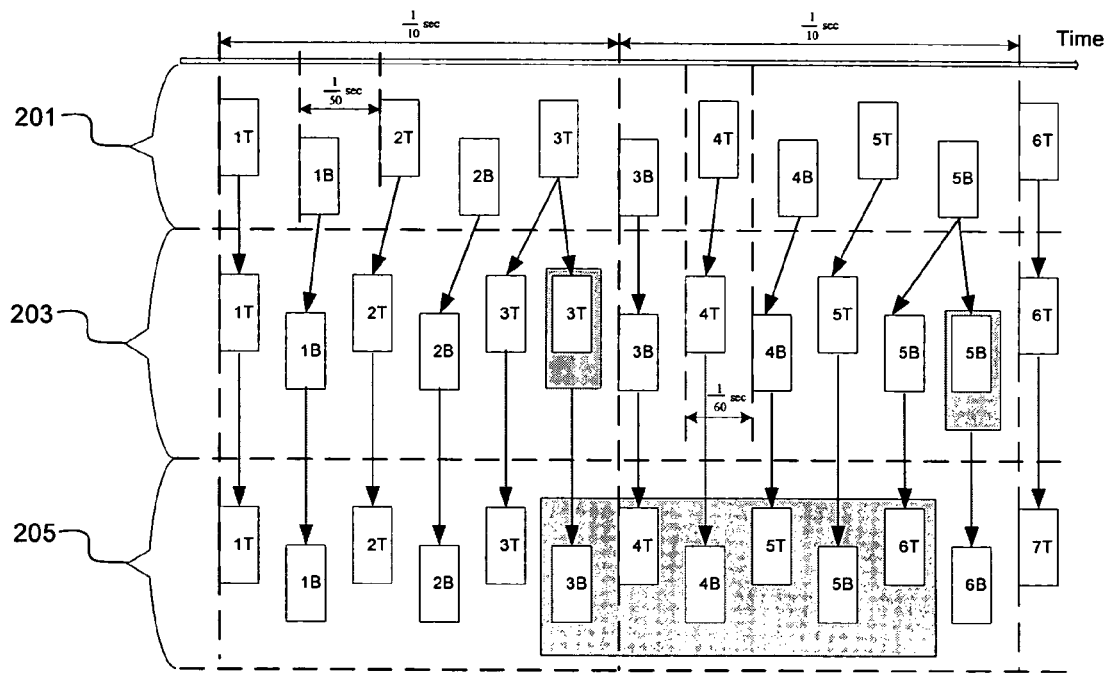
FIG. 2 illustrates a block diagram of an exemplary conversion from 50 Hz interlaced video to 60 Hz interlaced video, in accordance with an embodiment of the present invention.

FIG. 2 illustrates a block diagram of an exemplary conversion from 50 Hz interlaced video to 60 Hz interlaced video, in accordance with an embodiment of the present invention. At an initial stage 201, the source video may be 50 Hz interlaced video. The interlaced content may be alternating top and bottom fields, 1T, 1B, 2T, 2B, 3T, 3B, . . . etc. At the initial stage 201, every five fields may be displayed during a time interval of, for example, $\frac{1}{10}$ second; hence, the time interval between two consecutive fields may be $\frac{1}{50}$ second. At an intermediate stage 203, the video may be decoded at 60 Hz by repeating every fifth field. Hence the sequence from the original video 1T, 1B, 2T, 2B, 3T, 3B, . . . etc., may become 1T, 1B, 2T, 2B, 3T, 3T, 3B, . . . etc. In the new sequence, every six fields may be displayed during a time interval equal to the time interval used to display five fields at 50 Hz, for example, the time interval of $\frac{1}{10}$ second. As a result, the time interval between two consecutive fields becomes $\frac{1}{60}$ second. At a final stage 205, to ensure correct displaying of the video at 60 Hz, five fields, every 10 fields, starting at the repeated field, may be inverted. The resulting video may then have the expected pattern of alternative top and bottom fields.

Figure 3:
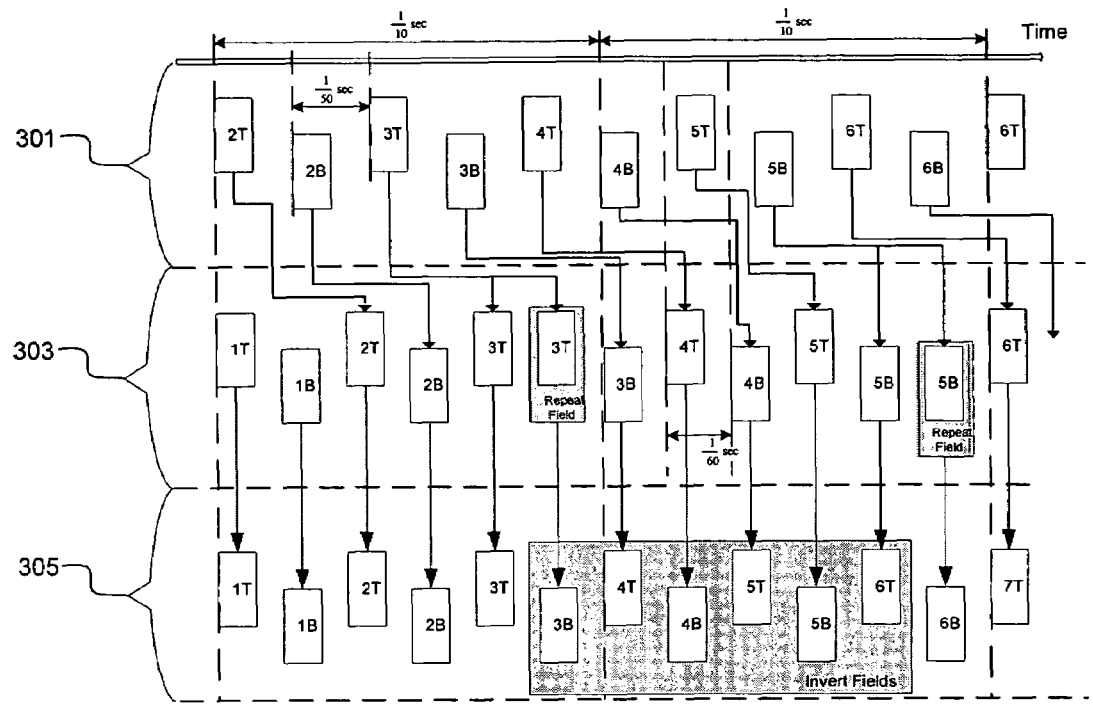
FIG. 3 illustrates a block diagram of an exemplary conversion from 50 Hz real time interlaced source to 60 Hz interlaced display, in accordance with an embodiment of the present invention.

FIG. 3 illustrates a block diagram of an exemplary conversion from 50 Hz real time interlaced video source to 60 Hz interlaced video display, in accordance with an embodiment of the present invention. A two-field delay may be utilized between decode-startup and feeder-startup. Three field stores may be used only during the time the output field is being repeated to buffer a new input field. Stages 301, 303, and 305 may correspond to stages 201, 203, and 205, respectively of FIG. 2, except that there is a two-field delay in stages 303 and 305 to accommodate a real time video source. The source video may be streaming and may get decoded in real-time, as a result the delay may cause a two-field delay, which results in a shift of the decoding and display of the fields. For example, at an initial stage 301, during a first time frame of $\frac{1}{10}$ second, the source video at 50 Hz interlaced video may contain the fields, which may correspond to 2T, 2B, 3T, 3B and 4T. At an intermediate stage 303, the video may be decoded at 60 Hz by repeating every fifth field, as a result of the real-time video, the first two fields in the first time frame of stage 301 may be from a previous time frame, and the field 2T may appear as the third field in the time frame rather than its original location in the beginning of the time frame. Referring to FIG. 2, if the first time frame of the initial stage 201 had the field sequence 2T, 2B, 3T, 3B, and 4T, the first time frame of the intermediate stage 203 would be 2T, 2B, 3T, 3B, 4T and 4T. Referring again to FIG. 3, as a result of the real-time video, the first frame of the intermediate stage 303 may be 1T, 1B, 2T, 2B, 3T, and 3T. In the new sequence, every six fields may be displayed during a time interval equal to the time interval used to display five fields at 50 Hz, for example, the time interval of $\frac{1}{10}$ second. As a result, the time interval between two consecutive fields becomes $\frac{1}{60}$ second. At a final stage 305, to ensure correct displaying of the video at 60 Hz, five fields, every 10 fields, starting at the repeated field such as, for example, 3T, may be inverted. As a result, the resulting video may then have the expected pattern of alternative top and bottom fields.

Figure 4:
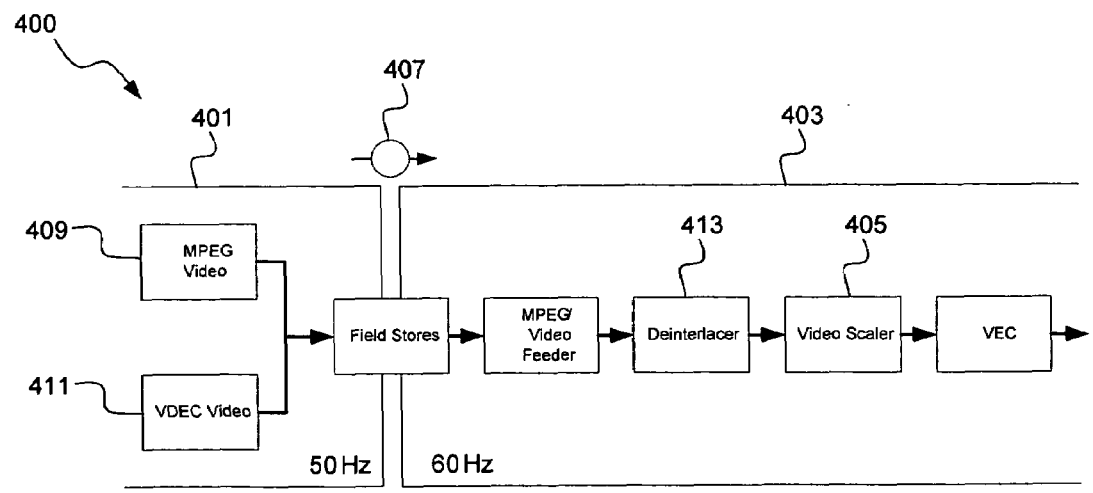
FIG. 4 illustrates another exemplary configuration of a video network, in accordance with an embodiment of the present invention.

FIG. 4 illustrates another exemplary configuration of a video network, in accordance with an embodiment of the present invention. The video network 400 may comprise a video input side 401 and a video output side 403. In an embodiment of the present invention, deinterlacing 576i to 576p as part of the rate change process may produce better quality output. Other formats such as, for example, deinterlacing 1080i to 1080p may also be beneficial in converting 1080i at 50 Hz to a video output at 60 Hz. This may be true especially when the video is still, for example. Therefore, a deinterlacer 413 may be used at the output video 403 to produce, for example, 576p from 576i. The scaler 405 may then produce either progressive or interlaced output video such as, for example, 720p or 1080i. Once 576p has been produced from 576i, field types may not need to be inverted for six fields in every twelve for interlaced output. Additionally, the deinterlacer 413 may effectively double the vertical resolution when going from 576i to 576p whenever possible, which may yield better quality output regardless of the output format.

In an embodiment of the present invention, the deinterlacer 413 may be a motion adaptive deinterlacer (MAD) such as, for example, the MAD as described by U.S. Provisional Patent Application Ser. No. 60/616,071, filed Oct. 5, 2004 entitled "Detection and Correction of Irregularities While Performing Inverse Telecine Deinterlacing of Video." Accordingly, U.S. Patent Application Ser. No. 60/616,071, filed Oct. 5, 2004 is incorporated herein by reference in its entirety.

In an embodiment of the present invention, the repeated frames may be generated using the repeated input field functionality as described by U.S. patent application Ser. No. 11/051,415 filed Feb. 4, 2005 entitled "Method and System for Trick Mode Support in a Motion Adaptive Deinterlacer with Inverse Telecine." Accordingly, U.S. patent application Ser. No. 11/051,415 filed Feb. 4, 2005 is incorporated herein by reference in its entirety.

In an embodiment of the present invention, there may be primary and secondary displays. The output video on the secondary display may be from the same source as that on a primary display. In such an embodiment, the source video may remain at 50 Hz to avoid conversion from 50 Hz to 60 Hz destined for the main display and then a subsequent conversion from 60 Hz to 50 Hz for the secondary. A sync slip buffer on the secondary output may be written into to ensure that the repeated field/frame may not be introduced into the secondary output.

The table below summarizes the frame rate conversion used based on the source and display type, in accordance with an embodiment of the present invention.

| Source Type | Progressive Sequence | Frame Rate | Feeder | Frame Rate Conversion |
| --- | --- | --- | --- | --- |
| 576i | I | 25 | Interlaced | (TBTBTT$_R$BTBTBB$_R$) |
| 576p | P | 25 | Interlaced | (TBTBTT$_R$BTBTBB$_R$) |
| 1080i | I | 25 | Interlaced | (TBTBTT$_R$BTBTBB$_R$) |
| 720p | P | 50 | Progressive | (Fr Fr Fr $\overline{Fr\ Fr}$ F$_R$) |
| 576p | P | 50 | Progressive | (Fr Fr Fr Fr Fr F$_R$) |
| 1080p | P | 25 | Interlaced | (TBTBTT$_R$BTBTBB$_R$) |
| 288i | I | 25 | Progressive | (Fr F$_R$) (Fr F$_R$) (Fr F$_R$ F$_R$) (Fr F$_R$) (Fr F$_R$ F$_R$) |
| 288i | I | 50 | Progressive | (Fr Fr Fr Fr Fr F$_R$) |

Where a sub-R indicated a frame/field repeated by copying the preceding frame/field, and the underlined fields need be inverted.

FIG. 5 illustrates a flow diagram of an exemplary process 500 of converting 50 Hz input progressive video to 60 Hz output progressive video, in accordance with an embodiment of the present invention. The process 500 may begin at a starting block 501, where the frames of the source video may be decoded. At a next block 503, every fifth frame of the input frames may be repeated to create an output video sequence. At a next block 505, every six frames of the output video may be displayed in a time frame equal to a time frame of five input frames. The process may end at an end block 507.

FIG. 6 illustrates a flow diagram of an exemplary process 600 of converting 50 Hz input interlaced video to 60 Hz output interlaced video, in accordance with an embodiment of the present invention. The process 600 may begin at a starting block 601, where the fields of the source video may be decoded. At a next block 603, every fifth field of the input fields may be repeated to create an output video sequence. At a next block 607, every six fields of the output video may be displayed in a time frame equal to a time frame of five input fields. The process may end at an end block 609. In an embodiment of the present invention, after block 603, the fields may be in a sequence such as, for example, TBTBT-TRBTBTBBR . . . etc. To preserve an alternating top field bottom field sequence, every other group of five fields may be inverted at a next step 605, before displaying the output video at block 607.

Figure 7:
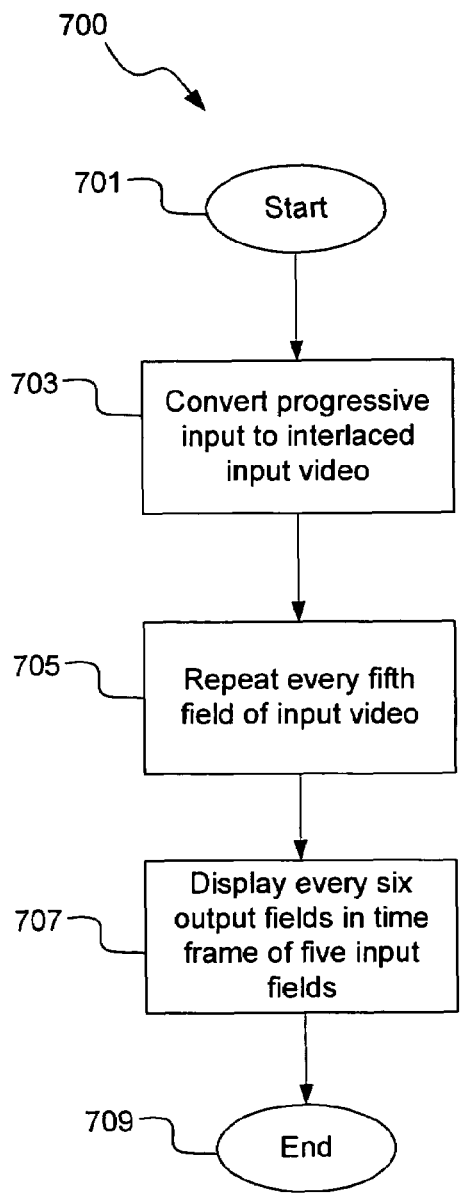
FIG. 7 illustrates a flow diagram of an exemplary process of converting 50 Hz input progressive video to 60 Hz output interlaced video, in accordance with an embodiment of the present invention.

FIG. 7 illustrates a flow diagram of an exemplary process 700 of converting 50 Hz input progressive video to 60 Hz output interlaced video, in accordance with an embodiment of the present invention. The process 700 may begin at a starting block 701, where the frames of the source video may be decoded. At a next block 703, the frames of the input video may be converted to fields. At a next block 705, every fifth field of the now input fields may be repeated to create an output video sequence. At a next block 707, every six fields of the output video may be displayed in a time frame equal to a time frame of five input fields, or every 12 output fields may be displayed in a time frame equal to a time frame of five input frames. The process may end at an end block 709.

Figure 8:
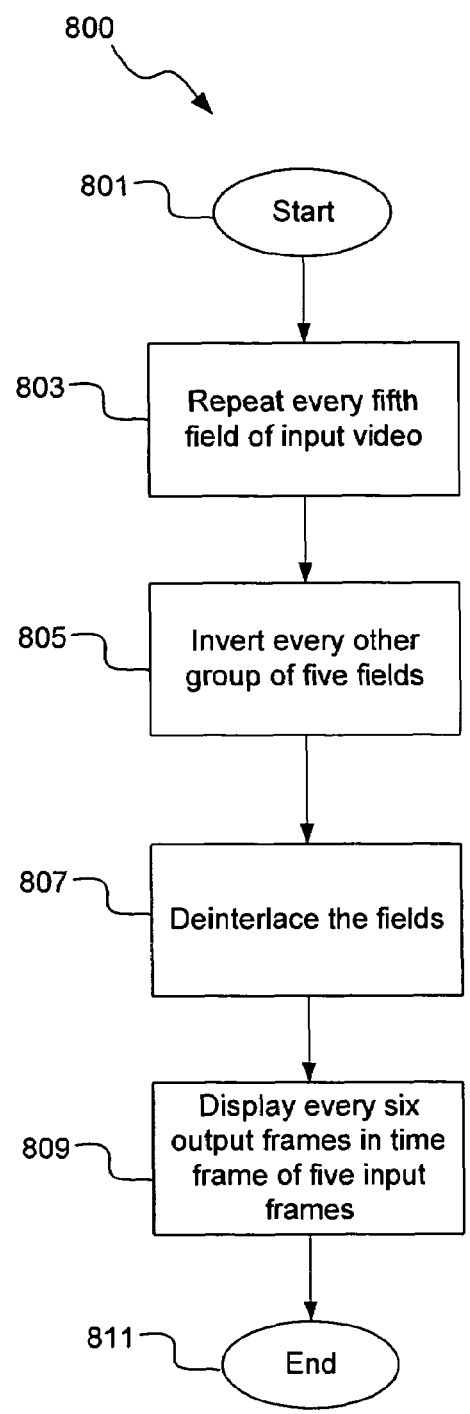
FIG. 8 illustrates a flow diagram of an exemplary process of converting 50 Hz input interlaced video to 60 Hz output progressive video, in accordance with an embodiment of the present invention.

FIG. 8 illustrates a flow diagram of an exemplary process 800 of converting 50 Hz input interlaced video to 60 Hz output progressive video, in accordance with an embodiment of the present invention. The process 800 may begin at a starting block 801, where the fields of the source video may be decoded. At a next block 803, every fifth field of the input fields may be repeated. At a next block 805, to preserve an alternating top field bottom field sequence, every other group of five fields may be inverted. The fields may then be deinterlaced into frames at a next block 807. At a next block 809, every six frames of the output video may be displayed in a time frame equal to a time frame of five input frames, or alternatively in a time frame equal to a time frame of 10 input fields. The process may end at an end block 811.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that converts a video source from a first rate to a second rate, the system comprising:
   a first processing circuitry that receives an input video at a first rate, wherein the input video comprises fields;
   a second processing circuitry that reproduces the input video as an output video at a second rate, wherein the output video comprises fields, wherein the second processing circuitry:
   repeats at least some of the fields of the input video, thereby resulting in each of the at least some of the fields being immediately followed by a repeat field, wherein each of the at least some of the fields having same polarity as the immediately following repeat field;
   inverts alternating groups of fields; and
   deinterlaces the output video fields after repeating at least some of the fields and inverting alternate groups of fields.

2. The system according to claim 1 wherein the input video comprises MPEG video.

3. The system according to claim 1 wherein the input video comprises analog video.

4. The system according to claim 1 wherein the first rate is 50 Hz and the second rate is 60 Hz.

5. The system according to claim 4 wherein the input video comprises frames.

6. The system according to claim 5 wherein the output video comprises frames where every sixth frame is a repeated version of the preceding frame.

7. A method that converts a video source from a first rate to a second rate, the method comprising:
   receiving an input video at a first rate, wherein the input video comprises fields;
   repeating every fifth field of the input video, thereby resulting in a repeat field immediately following every fifth field of the input video, and wherein each fifth field of the input video and the immediately following repeat field have the same polarity; and
   inverting alternating groups of fields;
   deinterlacing the output video fields after repeating and inverting alternate groups.

8. The method according to claim 7 wherein the input video comprises MPEG video.

9. The method according to claim 7 wherein the input video comprises analog video.

10. The method according to claim 7 wherein the first rate is 50 Hz and the second rate is 60 Hz.

11. The method according to claim 7 wherein the deinterlacing comprises motion adaptive deinterlacing.

* * * * *